(12) United States Patent
Prather et al.

(10) Patent No.: US 7,428,348 B2
(45) Date of Patent: Sep. 23, 2008

(54) ELECTRO-OPTICAL SWITCHING USING COUPLED PHOTONIC CRYSTAL WAVEGUIDES

(75) Inventors: Dennis W. Prather, Landenberg, PA (US); Ahmed Sharkawy, Newark, DE (US); Shouyun Shi, Newark, DE (US); Richard A. Soref, Newton Centre, MA (US)

(73) Assignee: University of Delaware, Newark, DE (US)

( * ) Notice: Subject to any disclaimer, the term of this patent is extended or adjusted under 35 U.S.C. 154(b) by 53 days.

(21) Appl. No.: 10/502,071

(22) PCT Filed: Jan. 17, 2003

(86) PCT No.: PCT/US03/01384

§ 371 (c)(1),
(2), (4) Date: Jul. 19, 2004

(87) PCT Pub. No.: WO03/062882

PCT Pub. Date: Jul. 31, 2003

(65) Prior Publication Data

US 2005/0147339 A1 Jul. 7, 2005

Related U.S. Application Data

(60) Provisional application No. 60/350,749, filed on Jan. 22, 2002.

(51) Int. Cl.
*G02F 1/295* (2006.01)
*G02B 6/26* (2006.01)
*G02B 6/42* (2006.01)
*G02B 6/10* (2006.01)

(52) U.S. Cl. .................. 385/9; 385/8; 385/16; 385/30; 385/39; 385/129

(58) Field of Classification Search .............. 385/9, 385/14–16, 23, 39, 123, 129–132, 8, 30, 385/50
See application file for complete search history.

(56) References Cited

U.S. PATENT DOCUMENTS 6,512,866 B1   1/2003   Fan et al. ............... 385/27

(Continued)

FOREIGN PATENT DOCUMENTS

JP      2001-281480      10/2001

OTHER PUBLICATIONS

A. Yariv et al., *Optical Waves in Crystals* (1984).

(Continued)

*Primary Examiner*—Sung Pak
*Assistant Examiner*—Daniel Petkovsek
(74) *Attorney, Agent, or Firm*—RatnerPrestia (57) ABSTRACT

An electro-optical switch implemented in coupled photonic crystal waveguides is disclosed. The switch is proposed and analyzed using both a finite-difference time-domain ("FDTD") method and a plane wave expansion ("PWM) method. The switch may be implemented in a square lattice of silicon posts in air, as well as in a hexagonal lattice of air holes in a silicon slab. Switching occurs due to a change in the conductance in the coupling region between the photonic crystal waveguides, which modulates the coupling coefficient and eventually causes switching. Conductance may be induced electrically by carrier injection or optically by electron-hole pair generation. The electro-optical switch has low insertion loss and optical crosstalk in both the cross and bar switching states.

41 Claims, 3 Drawing Sheets

U.S. PATENT DOCUMENTS

| | | | |
|---|---|---|---|
| 6,542,682 B2 | 4/2003 | Cotteverte et al. | 385/125 |
| 6,618,535 B1 | 9/2003 | Reynolds | 385/129 |
| 6,631,236 B2* | 10/2003 | Yamada | 385/129 |
| 6,775,430 B2* | 8/2004 | Flory et al. | 385/16 |
| 2001/0026668 A1 | 10/2001 | Yamada | 385/125 |
| 2002/0021878 A1 | 2/2002 | Allan et al. | 385/129 |
| 2002/0101895 A1* | 8/2002 | Augusto | 372/44 |
| 2006/0193557 A1* | 8/2006 | Bradley et al. | 385/32 |

OTHER PUBLICATIONS

R.A. Soref et al., "Electrooptical Effects in Silicon," *IEEE Journal of Quantum Electronics*, vol. QE-23, No. 1, pp. 123-129 (Jan. 1987).

E. Yablonovitch, "Inhibited Spontaneous Emission in Solid-State Physics and Electronics," *Physical Review Letters*, vol. 58, No. 20, pp. 2059-2062 (May 1987).

S. John, "Strong Localization of Photons in Certain Disordered Dielectric Superlattices," *Physical Review Letters*, vol. 58, No. 23, pp. 2486-2489 (Jun. 1987).

M. Plihal et al., "Phontonic band structure of two-dimensional systems: The triangular lattice," *Physical Review B*, vol. 44, No. 16, pp. 8565-8571 (Oct. 1991).

A. Taflove, *Computational Electrodynamics: The Finite-Difference Time-Domain Method* (1995).

R.A. Soref et al., "Proposed $N$-Wavelength $M$-Fiber WDM Crossconnect Switch Using Active Microning Resonators," *IEEE Photonics Technology Letters*, vol. 10, No. 8, pp. 1121-1123 (Aug. 1998).

O. Painter et al., "Defect modes of a two-dimensional photonic crystal in an optically thin dielectric slab," *Journal Optical Society of America*, vol. 16, No. 2, pp. 275-285 (Feb. 1999).

S.G. Johnson et al., "Guided modes in photonic crystal slabs," *The American Physical Society, Physical Review B*, vol. 60, No. 8, pp. 5751-5758 (Aug. 1999).

M. Bayindir et al., "Propagation of photons by hopping: A waveguiding mechanism through localized coupled cavities in three-dimensional photonic crystals," *The American Physical Society, Physical Review B*, vol. 61, No. 18, pp. R11855-R11858 (May 2000).

M. Bayindir et al., "Heavy photons at coupled-cavity waveguide band edges in a three-dimensional photonic crystal," *The American Physical Society, Physical Review B*, vol. 62, No. 4, pp. R2247-R2250 (Jul. 2000).

A. Chutinan et al., "Waveguides and waveguide bends in two-dimensional photonic crystal slabs," *The American Physical Society, Phys. Rev. B*, vol. 62, No. 7, pp. 4488-4492 (Aug. 2000).

L.L. Liou et al., "Dielectric Optical Waveguide Coupling Analysis Using Two-Dimensional Finite-Difference In Time-Domain Simulations," *Microwave and Optical Technology Letters*, vol. 26, No. 4, pp. 234-237 (Aug. 2000).

M. Lončar et al., "Waveguiding in planar photonic crystals," *Applied Physics Letters*, vol. 77, No. 13, pp. 1937-1939 (Sep. 2000).

M. Lončar et al., "Design and Fabrication of Silicon Photonic Crystal Optical Waveguides," *Journal of Lightwave Technology*, vol. 18, No. 10, pp. 1402-1411 (Oct. 2000).

C.J.M. Smith et al., "Low-loss channel waveguides with two-dimensional photonic crystal boundaries," *Applied Physics. Letters*, vol. 77, No. 18, pp. 2813-2815 (Oct. 2000).

D. Hermann et al., "Photonic band structure computations," *Optics Express*, vol. 8, No. 3, pp. 167-172 (Jan. 2001).

S. Fan et al., "Waveguide branches in photonic crystals," *Journal Optical Society of America*, vol. 18, No. 2, pp. 162-165 (Feb. 2001).

A. Sharkawy et al., "Multichannel wavelength division multiplexing with photonic crystals," *Applied Optics*, vol. 40, No. 14, pp. 2247-2252 (May 2001).

M.L. Povinelli et al., "Emulation of two-dimensional photonic crystal defect modes in a photonic crystal with a three-dimensional photonic bang gap," *Physical Review B*, vol. 64, pp. 75313-1 through 175313-8 (Jul. 2001).

M. Lončar et al., "Methods for controlling positions of guided modes of photonic-crystal waveguides," *Journal of the Optical Society of America*, vol. 18, No. 9, pp. 1362-1368 (Sep. 2001).

M. Koshiba, "Wavelength Division Multiplexing and Demultiplexing With Photonic Crystal Waveguide Couplers," *Journal of Lightwave Technology*, vol. 19, No. 12, pp. 1970-1975 (Dec. 2001).

A. Sharkawy et al., "Electro-optical switching using coupled photonic crystal waveguides," *Optical Society of America*, pp. 1-12 (2002).

S. Boscolo et al., "Coupling and Decoupling of Electromagnetic Waves in Parallel 2-D Photonic Crystal Waveguides" *IEEE Journal of Quantum Electronics*, vol. 38, No. 1, pp. 47-53 (Jan. 2002).

A. Chutinan et al., "Wider bandwith with high transmission through waveguide bends in two-dimensional photonic crystal slabs," *Applied Physics Letters*, vol. 80, No. 10, pp. 1698-1700 (Mar. 2002).

D. Prather et al., "High-efficiency coupling structure for a single-line-defect photonic-crystal waveguide," *Optics Letters*, vol. 27, No. 18, pp. 1601-1603 (Sep. 2002).

D.M. Pustai et al., "Tunable photonic crystal microcavities," *Applied Optics*, vol. 41, No. 26, pp. 5574-5579 (Sep. 2002).

D.W. Prather et al., "Design Applications of Photonic Crystals," *Handbook of Nanoscience, Engineering, and Technology*, pp. 21-1-21-33 (2003).

* cited by examiner

ELECTRO-OPTICAL SWITCHING USING COUPLED PHOTONIC CRYSTAL WAVEGUIDES

CROSS-REFERENCE TO RELATED APPLICATIONS AND CLAIM FOR PRIORITY

The present application is a U.S. National Stage application filed under 35 U.S.C. § 371, claiming priority of International application No. PCT/US03/01384, filed Jan. 17, 2003, and U.S. Provisional Patent Application Ser. No. 60/350,749, filed Jan. 22, 2002, under 35 U.S.C. §§ 119 and 365, the disclosures of the above-referenced applications being incorporated by reference herein in their entireties.

BACKGROUND OF THE INVENTION

A. Field of the Invention

The present invention relates generally to photonic crystals, and, more particularly to electro-optical switching using coupled photonic crystal waveguides.

B. Description of the Related Art

During the last decade photonic crystals (also known as photonic bandgap or PBG materials) have risen from an obscure technology to a prominent field of research. In large part this is due to their unique ability to control, or redirect, the propagation of light. E. Yablonovich, "Inhibited spontaneous emission in solid-state physics and electronics," *Physical Review Letters*, vol. 58, pp. 2059-2062 (May 1987), and S. John, "Strong localization of photons in certain disordered dielectric superlattices," *Physical Review Letters, vol.* 58, pp. 2486-2489 (June 1987) initially proposed the idea that a periodic dielectric structure can possess the property of a bandgap for certain frequencies in the electromagnetic spectra, in much the same way as an electronic bandgap exists in semiconductor materials. This property affords photonic crystals with a unique ability to guide and filter light as it propagates within it. Thus, photonic crystals have been used to improve the overall performance of many optoelectronic devices.

The concept of a photonic bandgap material is as follows. In direct conceptual analogy to an electronic bandgap in a semiconductor material, which excludes electrical carriers having stationary energy states within the bandgap, a photonic bandgap in a dielectric medium excludes stationary photonic energy states (i.e., electromagnetic radiation having some discrete wavelength or range of wavelengths) within that bandgap. In semiconductors, the electronic bandgap results as a consequence of having a periodic atomic structure upon which the quantum mechanical behavior of the electrons in the material must attain eigenstates. By analogy, the photonic bandgap results if one has a periodic structure of a dielectric material where the periodicity is of a distance suitable to interact periodically with electromagnetic waves of some characteristic wavelength that may appear in or be impressed upon the material, so as to attain quantum mechanical eigenstates.

A use of these materials that can be envisioned, is the optical analog to semiconductor behavior, in which a photonic bandgap material, or a plurality of such materials acting in concert, can be made to interact with and control light wave propagation in a manner analogous to the way that semiconductor materials can be made to interact with and control the flow of electrically charged particles, i.e., electricity, in both analog and digital applications.

Planar photonic crystal circuits such as splitters, high Q-microcavities, and multi-channel drop/add filters have been investigated both theoretically and experimentally in both two- and three-dimensional structures. For two-dimensional photonic crystal structures, the photonic crystal will be either perforated in an infinitely thick dielectric slab or formed of infinitely long dielectric rods. In-plane light confinement is achieved in such structures by multiple Bragg reflections due the presence of the photonic crystal. For three-dimensional photonic crystal structures, confinement in vertical direction is achieved by total internal reflection (TIR).

Work on photonic crystal waveguided components is now moving towards the development of photonic bandgap integrated circuits (PBGICs) in which a variety of active and passive optical components are integrated monolithically on a chip. Electro-optical switches are key components of such PBGICs, yet only one proposal for implementing such switches—a resonator device—has appeared in the literature. See S. Fan et al., "High Efficiency Channel drop filter with Absorption-Induced On/Off Switching and Modulation," *USA* (2000).

Thus, there is a need in the art for an electro-optical switching device for PBGICs that addresses the needs of the related art.

SUMMARY OF THE INVENTION

The present invention solves the problems of the related art by providing electro-optical switching using coupled photonic crystal waveguides. The switching mechanism is a change in conductance ($\sigma$) in the coupling region between two evanescently coupled photonic crystal waveguides. Conductance is induced electrically by carrier injection or is induced optically by electron-hole pair generation. The present invention provides real time optical signal processing by utilizing optical switching in photonic crystals over a small area which will facilitate future integration with optical integrated circuits.

The present invention provides a new technique for switching an electromagnetic wave propagating through photonic crystal waveguides. Electromagnetic waves can be either in the microwave or optical regime, based upon the constituent materials of a photonic crystal. The invention makes use of coupled photonic crystal waveguides, where the coupling coefficient between nearby waveguides can be modulated via an external electrical or optical means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF EMBODIMENTS OF THE PRESENT INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The present invention presents the conception, modeling and simulation of a PBG channel-waveguided directional coupler switch that utilizes electrically or optically induced loss (conductivity) in the coupling region between two coupled waveguides.

1. Design Procedure

Figure 1:
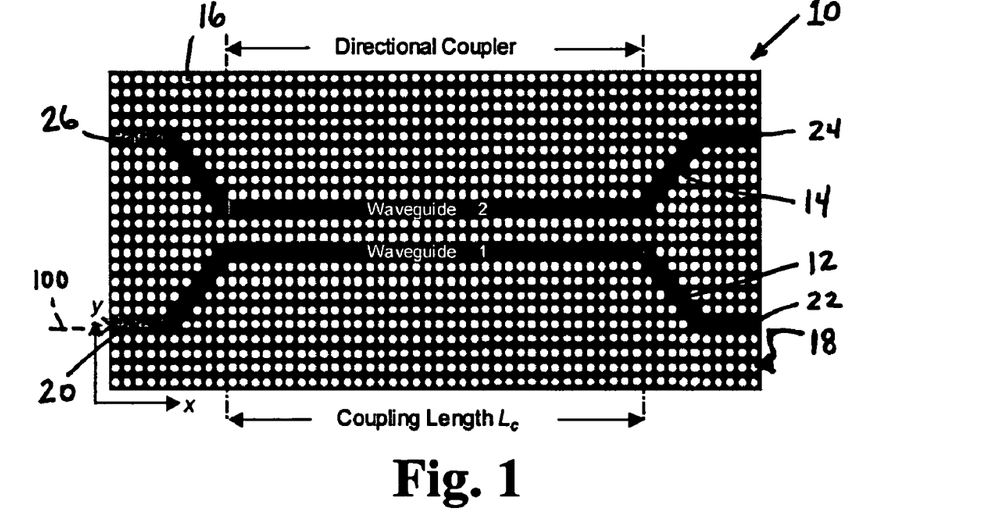
FIG. 1 is a schematic top plan view of a coupled photonic crystal waveguided (CPhCW) system consisting of two closely coupled PBG waveguides separated by two PBG layers of coupling length $L_c$, in accordance with an aspect of the present invention and wherein the system is formed using a periodic array of silicon pillars arranged in square lattice.

When two photonic crystal ("PhC") waveguides are brought in close proximity to each other they form what is known as a directional coupler. FIG. 1 shows a coupled photonic crystal waveguided (CPhCW) system in accordance with one aspect of the present invention and generally designated as reference numeral 10. CPhCW system 10 includes two closely coupled PBG waveguides 12, 14 separated by two PBG layers of coupling length $L_c$. Waveguide 12 includes two input/output ports, Port 1 (20) and Port 2 (22), and waveguide 14 has two input/output ports, Port 3 (24) and Port 4 (26). CPhCW system 10 may be formed using a periodic array of silicon pillars 16 arranged in a square lattice 18. Under suitable conditions, an electromagnetic light wave 100 launched into one of the waveguides 12 or 14 can couple completely into the adjacent waveguide 12 or 14. Once the light wave 100 has crossed over, the light wave 100 couples back into the launching waveguide 12 or 14 so that the power is exchanged continuously and as often as coupling length $L_c$ between the two waveguides 12, 14 permits. However, a complete exchange of optical power at all wavelengths is only possible between modes that have equal phase velocities or equal propagation constants. More specifically, the propagation constants must be equal for each waveguide in isolation. Equality of propagation constants, also known as phase synchronization, occurs naturally when the two waveguides are identical. In that case, all the guided modes of both waveguides are in phase synchronism and can couple to each other at all wavelengths, providing complete exchange of optical power.

The CPhCW system 10 shown in FIG. 1 is no longer a single mode device, which would be the case if both waveguides were fused together into one wider waveguide that is not a single mode waveguide. Instead, CPhCW system 10 has two eigenmode solutions, an even (symmetric) mode and an odd (anti-symmetric) mode, which have slightly different propagation constants and hence they propagate at different velocities. In order to calculate the coupling length $L_c$ necessary for a certain wavelength to completely cross over from first waveguide 12 to second waveguide 14, or vice versa, the frequency dependant propagation constant of the even and odd modes must be defined first, also known as the modal dispersion relation of the CPhCW system 10 of coupled waveguides 12, 14. In order to determine this relation, a computational unit cell (a "Supercell") shown in the bottom right corner of FIG. 2(a) is used since the structure is periodic.

For numerical experiments a directional coupler is first built using two single mode 2D-PhC waveguides, obtained by removing a row from a square lattice of infinitely long dielectric rods (or silicon pillars) in an air background. By way of example only and not limitation of the present invention, the design parameters for the photonic crystal may be defined as follows. The dielectric rods may have a dielectric constant $\epsilon_r$=11.56 and a radius r=0.2a, where a is the lattice constant of the crystal. Using these values the structure was found to have a complete bandgap in the spectral range of $0.23 \leq a/\lambda \leq 0.41$ for TM polarization (magnetic field in plane).

The structure shown in FIG. 1 may be numerically analyzed using either the plane wave expansion (PWM) method disclosed in M. Plihal et al., "Photonic band structure of two-dimensional systems: The triangular lattice," *Phys. Rev. B*, vol. 44, pp. 8565-8571 (1991), or the finite-difference time-domain (FDTD) method disclosed in D. Hermann et al., "Photonic Band Structure Computations," *Opt. Express*, vol. 8, pp. 167-172 (2001), and A. Taflove et al., *Computational Electrodynamics: The Finite-Difference Time-Domain Method*, 2d ed. (2000), with periodic boundary conditions. The result of either method is a modal dispersion diagram for the eigenmodes of the structure, as shown in FIG. 2(b), from which the modal propagation constants may be extracted and hence the coupling length necessary for full transmission of the optical power from one waveguide to a nearby waveguide may be calculated.

Figure 2:
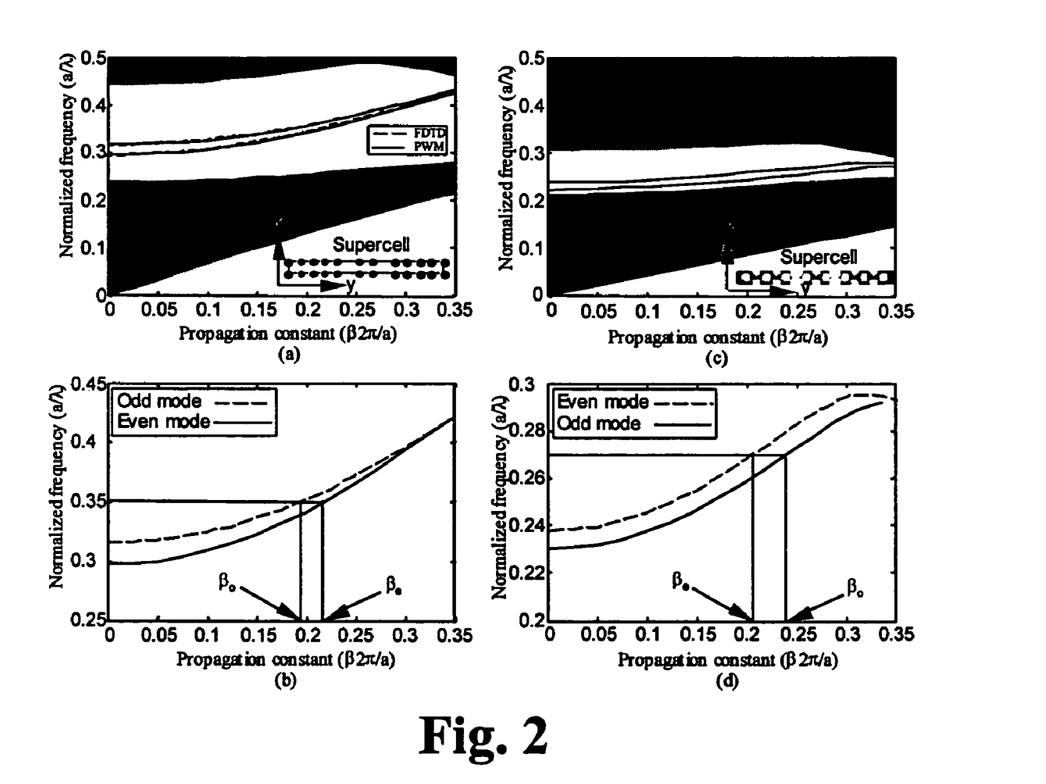
FIG. 2(a) is a dispersion diagram for the CPhCW system shown in FIG. 1 obtained using a plane wave expansion ("PWM") method and a finite-difference time-domain ("FDTD") method, where the dashed line corresponds to FDTD results and the solid line corresponds to PWM results.
FIG. 2(b) is a graph showing modal dispersion curves of the eigenmodes of the CPhCW system shown in FIG. 1, where the odd mode is the high frequency mode and the even mode is the low frequency mode, and a straight line drawn from a normalized frequency axis will intersect with the two curves from which modal propagation constants of the even and the odd modes can be determined and hence the coupling length $L_c$ can be calculated.
FIG. 2(c) is a dispersion diagram for the CPhCW system shown in FIG. 3.
FIG. 2(d) is a graph showing modal dispersion curves of the eigenmodes of the CPhCW system shown in FIG. 3, where the odd mode is the low frequency mode and the even mode is the high frequency mode, and a straight line drawn from a normalized frequency axis will intersect with the two curves from which modal propagation constants of the odd and even modes can be extracted and used to calculate the frequency dependant coupling length $L_c$.

Starting with the Supercell shown in FIG. 2(a), the PWM method was used to numerically compute the Bloch propagation constants for a plane wave propagating through the Supercell. The dispersion diagram obtained using the PWM method is shown in FIG. 2(a). On the other hand, if the FDTD method was used, a set of normalized propagation constants in the range of ($0<\beta 2\pi/a<0.35$) with an interval $\Delta\beta=0.01 \times 2\pi/a$ would be used. In order to categorize the odd and the even modes, excitations of a TM-even mode and a TM-odd mode were launched, from which it was found that eigenmodes with lower frequencies belong to the even mode, while the higher frequencies belong to the odd mode. The FDTD-generated dispersion diagram may then be plotted over the dispersion diagram obtained from the PWM method. As shown in FIG. 2(a), both dispersion diagrams overlap for a great extent.

From the modal dispersion curves (FIG. 2(b)), the length necessary for a signal launched in waveguide 12 to completely transfer to waveguide 14 may be calculated using the following procedure. For a specific frequency, the corresponding values of the normalized modal Bloch phase constants, for the even $\beta_e$ and the odd $\beta_o$ eigenmodes, are found. The coupling length $L_c$ required for full transmission can be then calculated using the following Equation:

$$L_c = \frac{\pi}{(\beta_e - \beta_o)}. \quad (1)$$

By way of example only, for the device shown in FIG. 1, a wavelength of 1550 nanometers (nm) (a/λ=0.35) was used, where a=542.5 nm, r=108.5 nm. From FIG. 2(b), the propagation constant of the odd and even modes are found: ($\beta^o$=2π× 0.1977/a=2.357×10⁶ m⁻¹) and ($\beta^e$=2π×0.2154/a=2.568× 10⁶ m⁻¹), from which the full coupling length may $L_c$ be calculated using the following Equation:

$$L_c = \pi/(2.568 - 2.357) \times 10^6 \quad (2)$$
$$= 14.88 \ \mu m$$
$$= 14.88 \ \mu m / 0.5425 \ \mu m$$
$$= 28a$$
$$= 9.6\lambda.$$

Thus, the complete transmission from one waveguide to the other requires approximately ten (10) wavelengths to occur, making such a theory viable for high density photonic integrated circuit applications.

In the case of a perforated silicon slab, which may be used as an effective index approximation to simplify a three-dimensional (3D) computational problem to a two-dimensional (2D) problem, the $n_{eff}$=2.88 may be calculated for the slab by solving the transcendental equation set forth in A. Yariv et al., Optical waves in Crystals (1984). Air holes of radius r/a=0.3 may be arranged in a hexagonal lattice. Using these values, the structure was found to have a bandgap in the spectral range of 0.24786≦a/λ≦0.3131 for TE polarization (electric field in plane). A full 3D structure consisting of a perforated slab of air holes arranged in a hexagonal lattice, a slab thickness t/a=0.6 and air holes radii of r/a=0.3 may be used in the numerical experiment. For such a structure, the bandgap was found to be in the spectral range of 0.2475≦a/λ≦0.3125 for the TE-like mode (even mode). Hence, effective index approximation may be used to reduce computational time and space.

Figure 3:
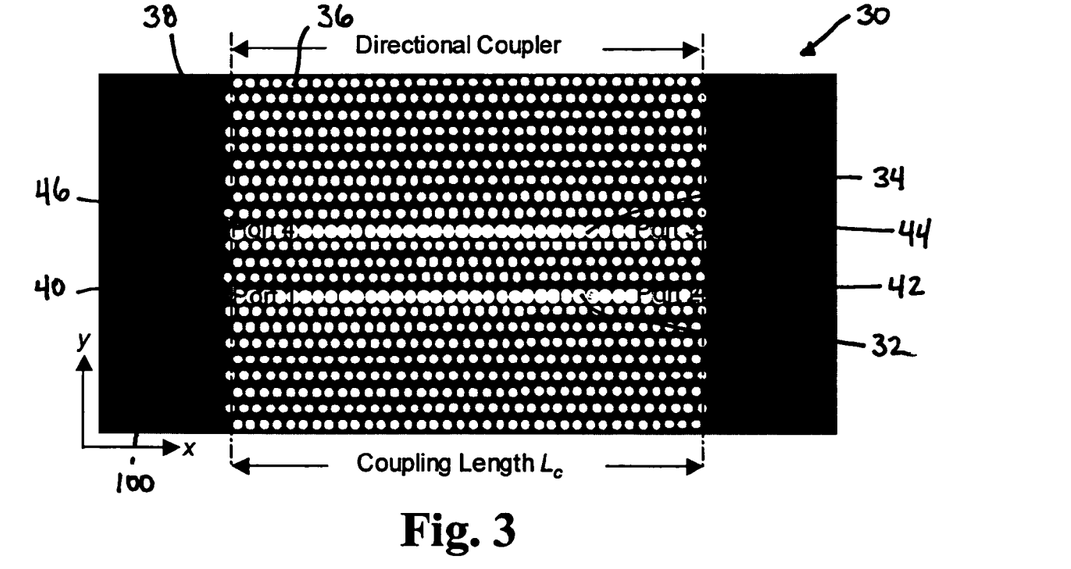
FIG. 3 is a schematic top plan view of a CPhCW system consisting of two closely coupled PBG waveguides separated by two PBG layers of coupling length $L_c$, in accordance with another aspect of the present invention and where the system is formed using a periodic array of air holes arranged in a hexagonal lattice.

FIG. 3 shows a CPhCW system in accordance with another aspect of the present invention and generally designated by reference numeral 30. CPhCW 30 includes two closely coupled PBG waveguides 32, 34 separated by two PBG layers of coupling length $L_c$. CPhCW system 30 is formed using a periodic array of air holes 36 arranged in a hexagonal lattice 38. Waveguide 32 includes two input/output ports, Port 1 (40) and Port 2 (42), and waveguide 34 has two input/output ports, Port 3 (44) and Port 4 (46).

To obtain the modal dispersion of the even mode and the odd mode, the eigenmodes within the Supercell shown in bottom right corner of FIG. 2(c) is numerically solved using the PWM method. Again, the only focus is on the modal dispersion curves within the bandgap of the structure (0.2475≦a/λ≦0.3125), as shown in FIG. 2(d). Once the modal dispersion curves are obtained for both the odd and even modes, the frequency dependant coupling length $L_c$ may be obtained following the same procedure presented above for the case of dielectric pillars.

By way of example only and not limitation of the present invention, assume a wavelength of 1550 nm (a/λ=0.27) is used, where a=418.5 nm, r=125.5 nm. FIG. 2(d) shows the propagation constant of the odd mode ($\beta^o$=2π×0.2034/ a=3.054×10⁶ m⁻¹) and the propagation constant of the even mode ($\beta_e$=2π×0.2359/a=3.541×10⁶ m⁻¹), from the and the full coupling length $L_c$ may be calculated using the following Equation:

$$L_c = \pi/(3.541 - 3.054) \times 10^6 \quad (3)$$
$$= 6.44 \ \mu m$$
$$= 6.44 \ \mu m / 0.4185 \ \mu m$$
$$= 16a$$
$$= 4.0\lambda.$$

Comparing the modal dispersion curves of the even and odd modes in FIG. 2(d), shows that, unlike the silicon pillar case (CPhCW 10) where higher frequency modes belong to the odd mode, and lower frequency modes belong to the even mode, for the perforated slab case (CPhCW 30) higher frequency modes belong to the even mode, and lower frequency modes belong to the odd mode.

Once the modal dispersion relations have been numerically extracted, the next step is to utilize the frequency dependence of such relations to design an optical switch in PhC waveguides for both the dielectric rods in an air background case, as well as air holes in a silicon background case.

2. Switching Approach

The "loss tangent" of dielectric material in the coupling region can be modified by external "commands" to spoil the coupling, thereby re-routing the light. This is what is known as a Δα switch (not the classical Δβ switch) in which the change in optical absorption coefficient Δα is employed. The change in conductance Δσ is proportional to Δα. The present inventors have found that the induced loss does not significantly attenuate the waves traveling in the straight-through channels. This behavior is analogous to that discussed in R. A. Soref et al., "Proposed N-Wavelength M-Fiber WDM Cross-connect Switch Using Active Microring Resonators," *IEEE Photonics Technology Letters*, vol. 10, pp. 1121-1123 (August 1998), where electro-absorption was assumed to reduce the Q of micro-ring resonators coupled to strip channel waveguides. To attain switching in 2D-PhC waveguides made from silicon and air (Si/air) or silicon and silicon dioxide (Si/SiO₂), the free-carrier absorption loss of Si can be controlled by: (1) carrier injection from forward-biased PN junctions on the posts; (2) depletion of doped posts with MOS gates; and (3) generation of electrons and holes by above-gap light shining upon the designated pillars, which is a contact-free process. If the PBG coupler is implemented in III-V semiconductor heterolayers, then the electro-absorption effect could be used. The CPhCW systems of the present invention differ from the conventional PBG switching device of Fan et al. (cited above), which relies upon a point-defect resonator, or two point defects, situated between two PBG channels. Fan et al. assumed that the Q of those cavities would be spoiled by loss induced electrically at the defects.

3. Numerical Analysis of the Switch

For the 1550 nanometer (nm) center wavelength, an exemplary 2D photonic crystal may be provided having 217 nm diameter silicon dielectric rods ($\epsilon_r$=11.6) arrayed in a square lattice (a=542.5 nm) on an air background. Line defects and bent lines define the channel waveguides. PBG waveguides of the present invention are analogous to the practical 2D e-beam-etched silicon waveguide system developed by M. Loncar et al., "Waveguiding in Planar Photonic Crystals," *Applied Physics Letters*, vol. 77, pp. 1937-1939 (Sep. 25, 2000).

For the perforated slab, an exemplary 2D photonic crystal hexagonal lattice may be provided having air holes with 251 nm diameters and a lattice constant a=418.5 nm. The slab had an effective index of $n_{eff}$=2.88. In this analysis, the FDTD method with perfectly matched absorbing boundary conditions around the rectangle enclosing the 2×2 switch was used to truncate the computational domain and minimize reflections from the outer boundary. The full wave solution for forward and backward traveling waves was solved alternately for E and H fields at different spatial points (e.g., at a $\lambda/20$ sampling rate) as time progressed. Examination of several switching test structures at a conductivity a approaching zero, showed that a coupling length $L_c$=28a for the square lattice, and a coupling length $L_c$=16a for the hexagonal lattice of the parallel-channel interaction region ensured that approximately 100% of the optical power launched into Port 1 (20, 40) was transferred to the other waveguide and output at Port 3 (24, 44). The spectral transmission of this coupler was analyzed and found to have a periodic response whose first peak has a Full Width Half Maximum ("FWHM") pass-band of about 20 mm.

4. Results

Figure 4:
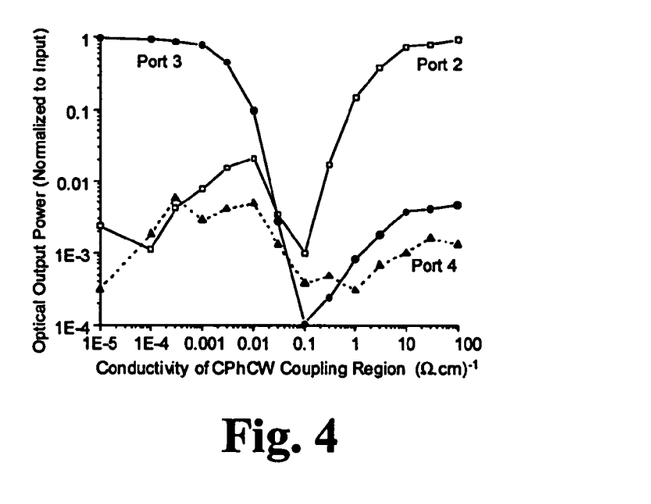
FIG. 4 is a graph showing the calculated switching characteristics of the CPhCW system shown in FIG. 1.

For a given value of conductivity ($\sigma$) and assuming unity power input to Port 1, the power emerging from Ports 2, 3, and 4, respectively, can be determined. The switching response as a function of conductivity a is shown in FIG. 4 for the square lattice device (CPhCW 10). The transmissions ("T") were found to be: T(Port 2)>81% for $\sigma$>30 $\Omega^{-1}$cm$^{-1}$ and T(Port 3)>88% for $\sigma$<0.0003 $\Omega^{-1}$cm$^{-1}$. At $\sigma$=10$^{-4}$ $\Omega^{-1}$cm$^{-1}$, the predicted crosstalks ("CT") were found to be: Forward CT=Port 2/Port 3=−29.4 dB, Backward CT=Port 4/Port 3=−27.3 dB, while for $\sigma$=100 $\Omega^{-1}$cm$^{-1}$, Forward CT=Port 3/Port 2=−23.1 dB, Backward CT=Port 4/Port 2=−28.6 dB.

Figure 5:
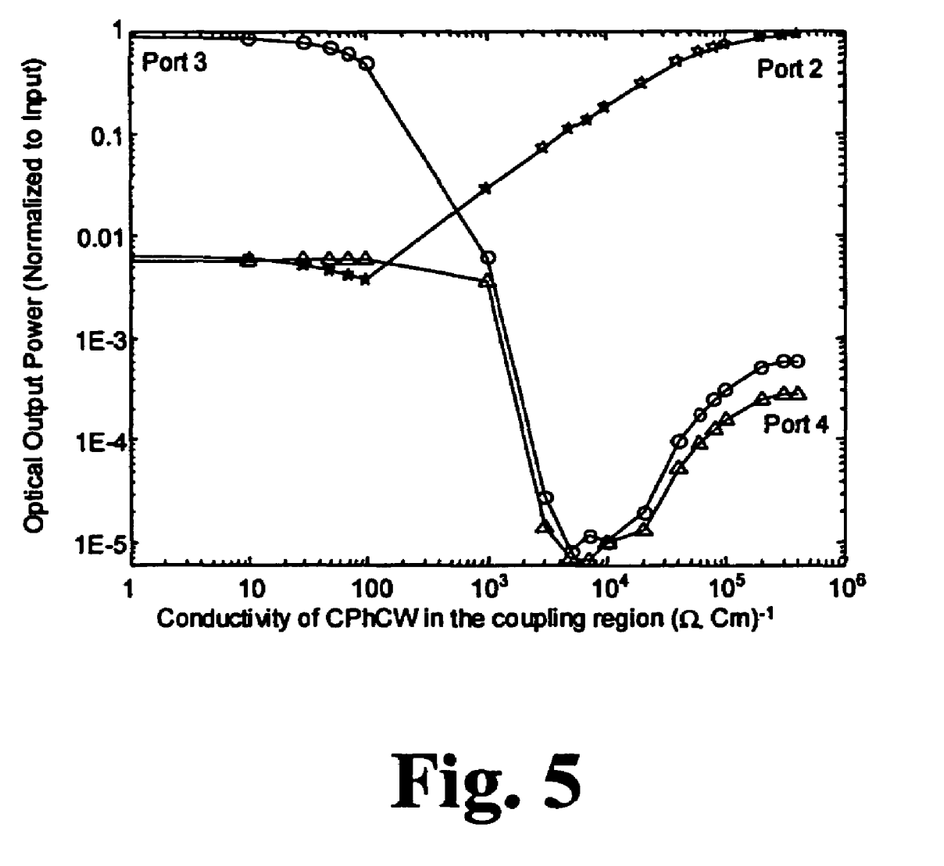
FIG. 5 is a graph showing the calculated switching characteristics of the CPhCW system shown in FIG. 3.

The switching response for the hexagonal lattice device (CPhCW 30) is shown in FIG. 5. The transmissions were found to be: T(Port 2)>85% for $\sigma$>10$^5$ $\Omega^{-1}$cm$^{-1}$ and T(Port3) >90% for $\sigma$<10$^2$ $\Omega^{-1}$cm$^{-1}$. At $\sigma$=10 $\Omega^{-1}$cm$^{-1}$, the predicted crosstalks were found to be: Forward CT=Port 2/Port 3=−22.2 dB, Backward CT=Port 4/Port 3=−23 dB, while for $\sigma$=3×10$^5$ $\Omega^{-1}$cm$^{-1}$, Forward CT=Port 3/Port 2=−32.2 dB, Backward CT=Port 4/Port 2=−36.9 dB.

The switching responses shown in FIGS. 4 and 5 show that there is a minimum value for the output optical power at various ports for a specific value of conductivity ($\sigma$=0.1 $\Omega^{-1}$cm$^{-1}$) for the square lattice device (CPhCW 10) and ($\sigma$=10$^4$ $\Omega^{-1}$cm$^{-1}$) for the hexagonal lattice device (CPhCW 30). At this transient value, the optical power launched at the input port will be absorbed in the coupling region between the two waveguides and the devices suffer a high attenuation coefficient $\alpha$ in the coupling region. An increase or decrease in the conductivity will redirect the optical power to either bar- or cross-states respectively.

CPhCW 10 and CPhCW 30 be interconnected and cascaded in the forward direction into an N×N optical cross-connect network. In this case, further optimization to crosstalk may be achieved by minimizing the reflections at the waveguide bends. Techniques for enhancing transmission through waveguide bends and hence reducing reflections include, broadband techniques (as set forth in A. Chutinan et al., "Wider bandwidth with high transmission through waveguide bends in two-dimensional photonic crystal slabs," *Appl Phys. Lett.*, vol. 80, pp. 1698-1700 (2002) and A. Chutinan et al., "Waveguides and waveguide bends in two-dimensional photonic crystal slabs," *Phys. Rev. B*, vol. 62, pp. 4488-4492 (2000)), and narrowband techniques (as set forth in C. J. M. Smith et al., "Low-Loss Channel Waveguides with Two-Dimensional Photonic Crystal Boundaries," *Appl. Phys. Lett.*, vol. 77, pp. 2813-2815, (2000) and S. Fan et al., "Waveguide branches in photonic crystals," J. Opt. Soc. Am. B, vol. 8, pp. 162-165, (2001)).

It will be apparent to those skilled in the art that various modifications and variations can be made in the electro-optical switching in a photonic bandgap waveguided coupler of the present invention and in construction of this device without departing from the scope or spirit of the invention. As an example, the material selections and dimensions discussed above are purely exemplary and not limiting of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electro-optical switch, comprising:
a non-piezoelectric photonic crystal having first and second waveguides separated by a region of the photonic crystal, each of the first and second waveguides having 1) a respective input portion and a respective output portion and 2) a coupling length where the first waveguide is proximate to the second waveguide; and
electrical means or optical means for inducing a change in conductance in the region of the photonic crystal along the coupling length, wherein the respective input portions are unconnected to each other, and the switch is configured such that the change in the conductance produces electro-optical switching between the first and second waveguides.

2. An electro-optical switch as recited in claim 1, wherein said photonic crystal comprises a periodic array of silicon pillars arranged in a square lattice.

3. An electro-optical switch as recited in claim 1, wherein said photonic crystal comprises a periodic array of air holes arranged in a hexagonal lattice.

4. An electro-optical switch as recited in claim 1, wherein the propagation constants of the first and second waveguides are different.

5. An electro-optical switch as recited in claim 4, wherein the first and second waveguides electro-optically couple to each other over a range of optical wavelengths.

6. An electro-optical switch as recited in claim 1, wherein the first and second waveguides are different.

7. An electro-optical switch as recited in claim 6, wherein the first and second waveguides electro-optically couple to each other over a range of optical wavelengths.

8. The electro-optical switch of claim 1, wherein the change in conductance along the coupling length is induced by electrical carrier injection provided by a forward-biased PN junction.

9. The electro-optical switch of claim 1, wherein the electrical or optical means is configured to modulate a coupling coefficient between the first and second waveguides.

10. A photonic bandgap integrated circuit, comprising:
a non piezoelectric photonic crystal; and
an electro-optical switch formed by providing first and second waveguides in said photonic crystal separated by a region of the photonic crystal and electrical means or optical means for inducing a change in conductance in the region of the photonic crystal along a coupling length, wherein the integrated circuit is configured such that the change in the conductance produces electro-optical switching between the first and second waveguides,
wherein the first and second waveguides each have 1) a respective input portion and a respective output portion, the respective input portions being unconnected to each other and 2) the coupling length where the first waveguide is proximate to the second waveguide.

11. A photonic bandgap integrated circuit as recited in claim 10, wherein said photonic crystal comprises a periodic array of silicon pillars arranged in a square lattice.

12. A photonic bandgap integrated circuit as recited in claim 10, wherein said photonic crystal comprises a periodic array of air holes arranged in a hexagonal lattice.

13. A photonic bandgap integrated circuit as recited in claim 10, wherein the propagation constants of the first and second waveguides are different.

14. A photonic bandgap integrated circuit as recited in claim 13, wherein the first and second waveguides electro-optically couple to each other over a range of optical wavelengths.

15. A photonic bandgap integrated circuit as recited in claim 10, wherein the first and second waveguides are different.

16. A photonic bandgap integrated circuit as recited in claim 15, wherein the first and second waveguides electro-optically couple to each other over a range optical wavelengths.

17. The photonic bandgap integrated circuit of claim 10, wherein the change in conductance along the coupling length is induced by electrical carrier injection provided by a forward-biased PN junction.

18. The photonic bandgap integrated circuit of claim 10, wherein the electrical or optical means is configured to modulate a coupling coefficient between the first and second waveguides.

19. A coupled photonic crystal waveguided system, comprising:
first and second photonic bandgap waveguides separated by a region of a non piezoelectric photonic crystal; and
electrical means or optical means for inducing a change in conductance in the region of the photonic crystal along a coupling length, wherein the system is configured such that the change in the conductance produces electro-optical switching between said first and second photonic bandgap waveguides,
wherein the first and second waveguides each have a 1) respective input portion and a respective output portion the respective input portions being unconnected to each other and 2) the coupling length where the first waveguide is proximate to the second waveguide.

20. A coupled photonic crystal waveguided system as recited in claim 19, wherein the photonic crystal comprises a periodic array of silicon pillars arranged in a square lattice.

21. A coupled photonic crystal waveguided system as recited in claim 19, wherein the photonic crystal comprises a periodic array of air holes arranged in a hexagonal lattice.

22. A coupled photonic crystal waveguided system as recited in claim 19, wherein the propagation constants of said first and second photonic bandgap waveguides are different.

23. A coupled photonic crystal waveguided system as recited in claim 22, wherein said first and second photonic bandgap waveguides electro-optically couple to each other over a range of optical wavelengths.

24. A coupled photonic crystal waveguided system as recited in claim 19, wherein said first and second photonic bandgap waveguides are different.

25. A coupled photonic crystal waveguided system as recited in claim 24, wherein said first and second photonic bandgap waveguides electro-optically couple to each other over a range of optical wavelengths.

26. The coupled photonic crystal waveguided system of claim 19, wherein the change in conductance along the coupling length is induced by electrical carrier injection provided by a forward-biased PN junction.

27. The coupled photonic crystal waveguided system of claim 19 wherein the electrical or optical means is configured to modulate a coupling coefficient along the coupling length.

28. A method for providing an electro-optical switch, comprising:
providing a non-piezoelectric photonic crystal;
providing first and second waveguides in the photonic crystal separated by a region of the photonic crystal, each of the first and second waveguides having a coupling length where the first waveguide is proximate to the second waveguide; and
inducing a change in conductance in the region of the photonic crystal along the coupling length to produce electro-optical switching between the first and second waveguides,
wherein the first and second waveguides each have a respective input portion and a respective output portion, the respective input portions being unconnected to each other.

29. A method for providing an electro-optical switch as recited in claim 28, wherein the photonic crystal comprises a periodic array of silicon pillars arranged in a square lattice.

30. A method for providing an electro-optical switch as recited in claim 28, wherein the photonic crystal comprises a periodic array of air holes arranged in a hexagonal lattice.

31. A method for providing an electro-optical switch as recited in claim 28, wherein the propagation constants of the first and second waveguides are different.

32. A method for providing an electro-optical switch as recited in claim 31, wherein the first and second waveguides electro-optically couple to each other over a range of optical wavelengths.

33. A method for providing an electro-optical switch as recited in claim 28, wherein the first and second waveguides are different.

34. A method for providing an electro-optical switch as recited in claim 33, wherein the first and second waveguides electro-optically couple to each other over a range of optical wavelengths.

35. The method for providing an electro-optical switch of claim 28, wherein said changing the conductance along the coupling length comprises injecting electrical carriers provided by a forward-biased PN junction.

36. The method for providing an electro-optical switch of claim 28, wherein said changing the conductance along the coupling length comprises modulating a coupling coefficient between the first and second waveguides.

37. The method for providing an electro-optical switch of claim 28, wherein said changing the conductance along the coupling length comprises changing an optical absorption along the coupling length.

38. An electro-optical switch, comprising:
a non-piezoelectric photonic crystal having first and second waveguides separated by a region of the photonic crystal, wherein each of the first waveguide and the second waveguide have a coupling length where the first waveguide is proximate to the second waveguide; and
means for inducing a change in conductance in the region of the photonic crystal along the coupling length, wherein the switch is configured such that the change in the conductance produces electro-optical switching between the first and second waveguide,
wherein the change in conductance along the coupling length is optically induced by electron-hole pair generation.

39. A photonic bandgap integrated circuit, comprising:
a non-piezoelectric photonic crystal; and
an electro-optical switch formed by providing first and second waveguides in said photonic crystal separated by a region of the photonic crystal and means for inducing a change in conductance in the region of the photonic crystal along a coupling length, wherein the integrated circuit is configured such that the change in the conductance produces electro-optical switching between the first and second waveguides,
wherein the change in conductance along the coupling length is optically induced by electron-hole pair generation and the first waveguide is proximate to the second waveguide along the coupling length.

40. A coupled photonic crystal waveguided system, comprising:
first and second photonic bandgap waveguides separated by a region of a non-piezoelectric photonic crystal; and
means for inducing a change in conductance in the region of the photonic crystal along a coupling length, wherein the system is configured such that the change in the conductance produces electro-optical switching between said first and second photonic bandgap waveguides,
wherein the change in conductance along the coupling length is induced optically by electron-hole pair generation, and
the first waveguide is proximate to the second waveguide along the coupling length.

41. A method for providing an electro-optical switch, comprising:
providing a non-piezoelectric photonic crystal;
providing first and second waveguides in the photonic crystal separated by a region of the photonic crystal, each of the first and second waveguides having a coupling length where the first waveguide is proximate to the second waveguide; and
inducing a change in conductance in the region of the photonic crystal along the coupling length to produce electro-optical switching between the first and second waveguides,
wherein said changing the conductance along the coupling length comprises optically inducing electron-hole pair generation.

* * * * *